US012809973B2

(12) United States Patent
Kazato

(10) Patent No.: US 12,809,973 B2
(45) Date of Patent: Nov. 24, 2026

(54) DETECTION AND RESPONSE CONTROL SYSTEM, DETECTION AND RESPONSE CONTROL METHOD, HARDWARE ACCELERATOR, CONTROLLER, AND PROGRAM

(71) Applicant: NTT, Inc., Tokyo (JP)

(72) Inventor: Yuta Kazato, Musashino (JP)

(73) Assignee: NTT, Inc., Tokyo (JP)

( * ) Notice: Subject to any disclaimer, the term of this patent is extended or adjusted under 35 U.S.C. 154(b) by 113 days.

(21) Appl. No.: 18/870,124

(22) PCT Filed: Jun. 1, 2022

(86) PCT No.: PCT/JP2022/022305
§ 371 (c)(1),
(2) Date: Nov. 27, 2024

(87) PCT Pub. No.: WO2023/233580
PCT Pub. Date: Dec. 7, 2023

(65) Prior Publication Data
US 2025/0322066 A1 Oct. 16, 2025

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ......................... G06F 21/554; G06F 2221/034
See application file for complete search history.

(56) References Cited

U.S. PATENT DOCUMENTS

| | | | | |
|---|---|---|---|---|
| 12,627,532 B1* | 5/2026 | Li | | H04L 25/0222 |
| 2018/0084010 A1* | 3/2018 | Joseph | | H04L 63/1425 |
| 2018/0084011 A1 | 3/2018 | Joseph et al. | | |
| 2018/0084012 A1 | 3/2018 | Joseph et al. | | |
| 2018/0332061 A1* | 11/2018 | Terada | | G06F 21/552 |
| 2020/0242223 A1 | 7/2020 | Geng | | |

(Continued)

FOREIGN PATENT DOCUMENTS

| | | |
|---|---|---|
| JP | 2018133753 A | 8/2018 |
| JP | 2018194880 A | 12/2018 |

(Continued)

OTHER PUBLICATIONS

Balasubramanian et al., "RIC: a Ran intelligent controller platform for AI-enabled cellular networks," IEEE Internet Computing, Mar./Apr. 2021, 25(2):7-17.

*Primary Examiner* — Stephen T Gundry
(74) *Attorney, Agent, or Firm* — Fish & Richardson P.C.

(57) ABSTRACT

An attack detection and handling control system includes a controller and a hardware accelerator. The hardware accelerator includes a data acquisition unit that acquires communication data from a communication device, a data preprocessing unit that performs preprocessing on the acquired data, an attack detection unit that determines an attack using a learning model, a detection alert notification unit that generates a detection alert, and a handling performance unit that performs attack handling based on a handling control policy. The controller includes a learning unit that generates the learning model for detecting the attack and a handling determination unit that creates the handling control policy for the attack.

7 Claims, 6 Drawing Sheets

(56) References Cited

U.S. PATENT DOCUMENTS

| | | | | |
|---|---|---|---|---|
| 2020/0314130 | A1* | 10/2020 | Nakai | H04L 63/1425 |
| 2020/0344603 | A1 | 10/2020 | Gamishev | |
| 2021/0258796 | A1 | 8/2021 | Li et al. | |
| 2025/0330382 | A1* | 10/2025 | Adapa | H04L 41/0894 |
| 2025/0337755 | A1* | 10/2025 | Sathya Moorthy | H04L 63/1416 |
| 2025/0337773 | A1* | 10/2025 | Deng | H04L 63/145 |
| 2025/0350590 | A1* | 11/2025 | Sethia | H04L 63/0823 |
| 2025/0364719 | A1* | 11/2025 | Duong | H01Q 3/46 |
| 2025/0365298 | A1* | 11/2025 | Adivi | H04L 63/1416 |
| 2025/0374057 | A1* | 12/2025 | Kazato | H04W 12/121 |
| 2025/0374120 | A1* | 12/2025 | Uniyal | H04W 28/0289 |
| 2025/0385931 | A1* | 12/2025 | Hiraishi | H04L 63/1425 |
| 2026/0006042 | A1* | 1/2026 | Sethi | H04L 63/1416 |
| 2026/0032103 | A1* | 1/2026 | Mestery | H04L 63/0236 |
| 2026/0032147 | A1* | 1/2026 | Atamli | H04L 63/1441 |
| 2026/0046211 | A1* | 2/2026 | Tsuda | H04L 41/14 |
| 2026/0067309 | A1* | 3/2026 | Çomak | H04L 63/1408 |
| 2026/0106868 | A1* | 4/2026 | Lakshminarayana | H04L 63/0838 |
| 2026/0122081 | A1* | 4/2026 | Wang | H04L 63/1416 |
| 2026/0127084 | A1* | 5/2026 | Mano | G06F 11/2257 |
| 2026/0128999 | A1* | 5/2026 | Kochiev | H04L 47/26 |

FOREIGN PATENT DOCUMENTS

| | | | |
|---|---|---|---|
| JP | 2019535068 | A | 12/2019 |
| JP | 2020533704 | A | 11/2020 |
| JP | 2021510984 | A | 4/2021 |
| JP | 2021535517 | A | 12/2021 |
| WO | WO 2018053337 | A1 | 3/2018 |

* cited by examiner

DETECTION AND RESPONSE CONTROL SYSTEM, DETECTION AND RESPONSE CONTROL METHOD, HARDWARE ACCELERATOR, CONTROLLER, AND PROGRAM

CROSS-REFERENCE TO RELATED APPLICATIONS

This is a National Stage Application of PCT Application No. PCT/JP2022/022305, filed on Jun. 1, 2022. The disclosure of the prior application is considered part of the disclosure of this application, and is incorporated in its entirety into this application.

BACKGROUND

Technical Field

The present invention relates to a detection and handling control system, a detection and handling control method, a hardware accelerator, a controller, and a program for detecting a cyber attack in a field of network security.

Background Art

In 5G new radio (5GNR), which is a next-generation standard of mobile communication as one of network communication forms, in addition to establishment of a standard specification of a communication standard, openization and software virtualization of communication devices and communication interfaces composing a radio access network (RAN) are in progress. In such an open RAN, for example, in a RAN intelligence controller (RIC), a type of centralized controller equipped with an artificial intelligence (AI) functionality described in Non Patent Literature 1, optimization or the like of network control and resources is being promoted. On the other hand, there is a concern of a sharp increase of cyber attacks that exploit 5G requirement technical specifications of interfaces that is ultra-high speed, multiple simultaneous connection, ultra-low latency, and openized, and damage caused by the cyber attacks.

In the current networks such as network functions virtualization (NFV), software defined networking (SDN), and RAN, user communication is implemented with separation between a control plane (C-Plane) signal that is for session control and management between a terminal and a communication device/base station and a user plane (U-Plane) signal that performs transmission for actual data communication for a user. In the control signal and the user data signal, for example, a cyber attack such as a signal spoofing attack, Volumetric DDoS attack, and jamming occurs between a terminal and a communication device in a communication layer, in a radio physical layer, or in a radio resource control (RRC) protocol layer performing communication control, and the like, and performs unauthorized control in user communications and communication devices, obstruction of services by stressing network bandwidth, unauthorized acquisition of confidential information, and the like. As a result, a user communication failure or information leakage may occur. Further, the entire service may become unavailable. In order to handle such a cyber attack targeted for network communication, Patent Literature 1 implements handling control of a cyber attack by using a filtering function of a communication device.

CITATION LIST

Non Patent Literature

Non Patent Literature 1: Balasubramanian, Bharath, et al., “RIC: A RAN intelligent controller platform for AI-enabled cellular networks”, IEEE Internet Computing 25.2 (2021): 7-17.

Patent Literature

Patent Literature 1: JP 2018-133753 A

SUMMARY OF THE INVENTION

Technical Problem

However, in the case of attack detection and attack handling using a centralized controller system equipped with an AI functions in the related art, as it is required to analyze all the data of the U-Plane and the C-Plane, it is not possible to perform real-time attack detection. In addition, resources used in communication devices are consumed when a delay in attack detection occurs or when handling the attack.

Specifically, the technique described in Non Patent Literature 1 is unable to perform real-time attack detection of a cyber attack due to the delay time and an increase in the resources (resources used, network transfer resources). In addition, the technique described in Patent Literature 1 is a measure using a filtering method in communication devices and does not support machine learning and/or offloading to an accelerator. As a result, accuracy and processing capability in attack handling are reduced. Therefore, in cases where attack detection and attack handling cannot be performed in real time, user communication in the network may not be performed and/or the entire service may not be provided.

The present invention has been made in view of these points, and an object of the present invention is to reduce the delay time in attack detection and attack handling of a cyber attack on a communication network and to reduce resources used in a communication device.

Solution to Problem

In order to solve the above problems, an aspect of the present invention is an attack detection and handling control system for performing detection and handling of a cyber attack, the attack detection and handling control system including: a controller configured to perform network control in an access network; and a hardware accelerator configured to be connected to a communication device of the access network and to the controller, wherein the hardware accelerator includes: a data acquisition unit configured to acquire communication data from the communication device; a data preprocessing unit configured to perform, on the acquired communication data, preprocessing of extracting predetermined data required for attack detection and performing statistical processing on the extracted predetermined data, and transmit the preprocessed data to the controller; an attack detection unit configured to receive a learning model for detecting an attack to be executed through the communication data from the controller and make a first determination in inline processing using the learning model as to whether the communication data acquired by the data acquisition unit is the attack; a detection alert notification unit configured to generate a detection alert including detection information and network information and transmits the detection alert to the controller, the detection information including a detection reason of the communication data determined as the attack, the network information being related to the communication data; and a handling performance unit configured to acquire, from the controller, a handling control policy including information required for attack handling, and perform, based on the acquired handling control policy, the attack handling on the communication data acquired by the data acquisition unit in inline processing, and wherein the controller comprises: a learning unit configured to receive the preprocessed data from the hardware accelerator and, based on the received preprocessed data, generate the learning model for detecting the attack to be executed through the communication data; and a handling determination unit configured to receive the detection alert from the hardware accelerator, make a second determination using the received detection alert as to whether attack handling is required, and when the second determination is that attack handling is required, create the handling control policy so as to include a type of the attack and a handling technique and transmit the handling control policy to the hardware accelerator.

Advantageous Effects of Invention

According to the present invention, it is possible to reduce the delay time in attack detection and attack handling of a cyber attack on a communication network and to reduce resources used in a communication device.

DESCRIPTION OF EMBODIMENTS

Next, a mode for carrying out the present invention (hereinafter referred to as the "present embodiment") will be described.

Figure 1:
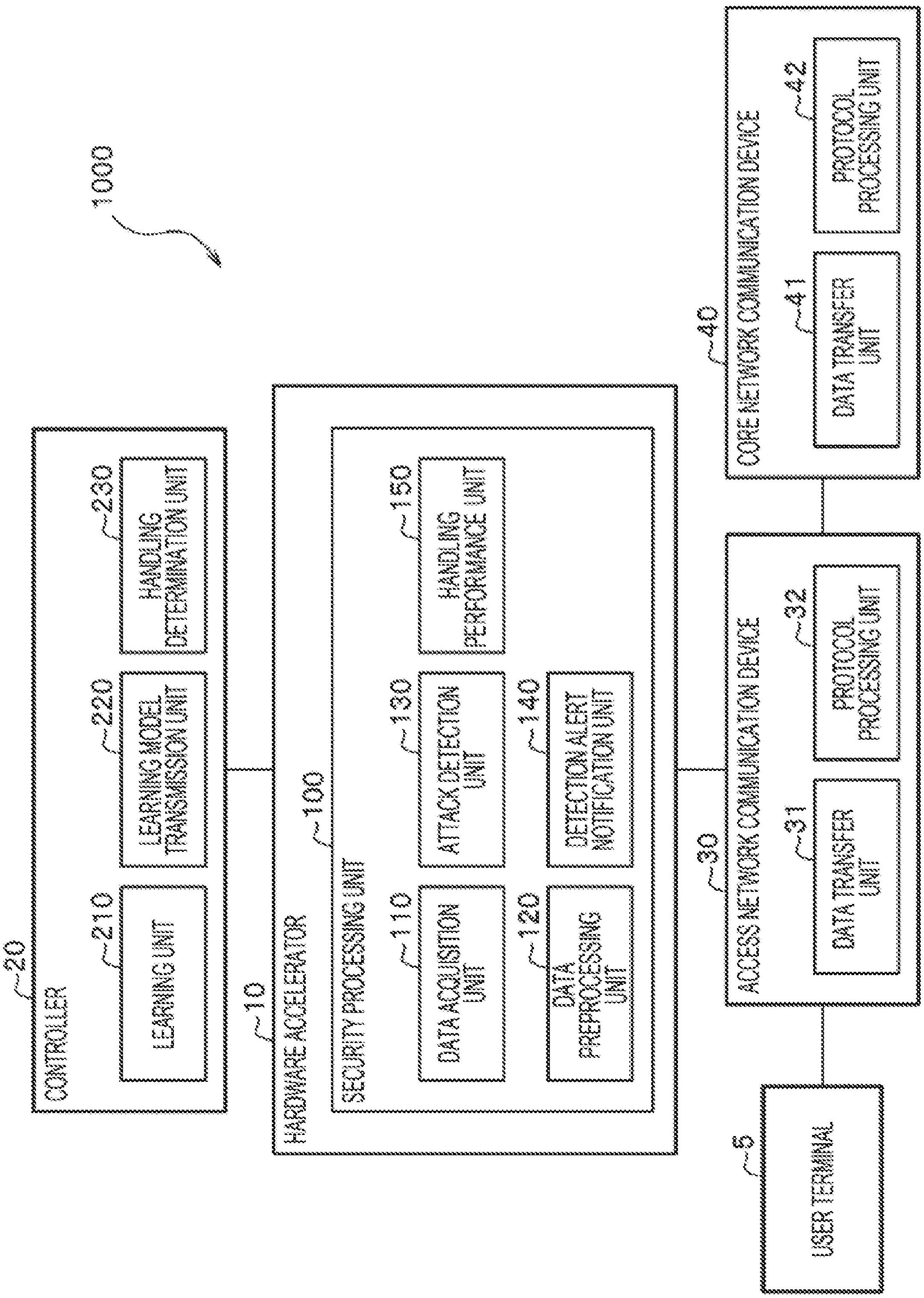
FIG. 1 is a diagram illustrating the overall configuration of a detection and handling control system according to the present embodiment.

FIG. 1 is a diagram illustrating the overall configuration of a detection and handling control system 1000 according to the present embodiment.

In the present embodiment, in a RAN (5G RAN), a description will be given of an example in which attack detection and attack handling are implemented in a manner of being functionally separated by cooperation of an NIC-equipped FPGA board (hardware accelerator 10) with security functionality and a centralized controller (RIC) (controller 20) with AI functionality.

As illustrated in FIG. 1, the detection and handling control system 1000 includes an access network communication device 30 (a communication device of an access network) that is connected to a user terminal 5 and transfers data or the like acquired from the user terminal 5 to a core network communication device 40, a hardware accelerator 10, and a controller 20.

The core network communication device 40 is a device that transfers data acquired from the access network communication device 30 or the like to a data network (the Internet or the like).

In the access network communication device 30 and the core network communication device 40, data transfer units 31 and 41 transfer RAN data (U-plane/C-plane) received from the user terminal 5 or another communication device, and protocol processing units 32 and 42 perform processing such as protocol conversion.

The hardware accelerator 10 is connected to the communication device as, for example, a field programmable gate array (FPGA) board (FPGA SmartNIC) on which a network interface card (NIC) is mounted. More specifically, the hardware accelerator 10 is connected to the access network communication device 30, as an FPGA board using an extension interface such as peripheral component interconnect express (PCIe). The hardware accelerator 10 performs preprocessing of acquired data, attack detection processing, and attack handling processing in cases where an attack is detected.

The controller 20 is connected to the hardware accelerator 10, and performs generation of a learning model for detecting cyber attacks, creation of a handling control policy related to attack handling, and the like.

The hardware accelerator 10 and the controller 20 cooperate with each other such that learning, attack detection, and attack handling are performed in a manner of being functionally separated, thereby to achieve low latency and reduction of resources (mainly operation resources and NW resources) used in the communication device.

Hereinafter, the hardware accelerator 10 and the controller 20 will be described in detail.

Hardware Accelerator

The hardware accelerator 10 includes a security processing unit 100 that implements a security functionality. As illustrated in FIG. 1, the security processing unit 100 includes a data acquisition unit 110, a data preprocessing unit 120, an attack detection unit 130, a detection alert notification unit 140, and a handling performance unit 150.

The data acquisition unit 110 receives an input of communication data (e.g., U-plane data or C-plane data) transferred from the access network communication device 30.

The data acquisition unit 110 may acquire all the data of the received data as the target of attack detection or may acquire only specific signaling (call control information) to acquire data efficiently by performing sampling.

For example, the data acquisition unit 110 may designate a field of a specific packet of the RAN to acquire information on the designated field.

The data acquisition unit 110 outputs the acquired data to the data preprocessing unit 120.

The data preprocessing unit 120 performs preprocessing on the data received from the data acquisition unit 110. This preprocessing function is implemented in a programmable logic of the hardware accelerator 10, and the preprocessing is performed in an inline manner.

The data preprocessing unit 120 performs extraction of predetermined data required for attack detection (first-stage processing of the preprocessing) by, for example, with respect to the acquired communication data, removing data not required for attack detection or performing processing on data.

In addition, the data preprocessing unit 120 performs statistical processing (second-stage processing of the preprocessing) on the communication data subjected to the data processing and transmits data on which the statistical processing has been performed to the controller 20 after a statistical execution period (e.g., 60 seconds, 5 minutes) has elapsed. As the statistical processing, for example, calculation of an average value, a variance value, a maximum value, and a minimum value, regularization processing, standardization processing, and the like are performed.

For example, the data preprocessing unit 120 can reduce the amount of data to be transmitted to the controller 20 by extracting only the data field related to an attack feature amount (predetermined data required for attack detection) from the RAN communication data and performing statistical processing on the extracted data field.

An example of the "data field related to the attack feature amount" will be described. When the user terminal (UE) and a communication base station establish a connection, procedures of random access and RRC setup are performed. In a MAC protocol signaling DoS attack or a radio resource control (RRC) protocol signaling DoS attack, which is an attack targeting these sequences, UE identification information and cell information (e.g., a value of radio network temporary identifier (RNDI)), a type of an RRC request message, and a packet size of the data are the data fields related to the attack feature amount. In addition, radio wave quality information of the UE, information on radio wave intensity of the base station, resource information of the cell, and the like, which are additional information related to the RAN communication data and can be acquired as resource information from the UE and/or the communication base station, can also be used as the data fields related to the attack feature amount.

After the information on the data fields is extracted, the data preprocessing unit 120 performs statistical processing as data preprocessing to, for example, calculate statistics of the RRC request message.

The attack detection unit 130 performs attack detection processing on the communication data (RAN communication data) acquired by the data acquisition unit 110 in inline processing by using a learning model (a learning model for detecting an attack) received from the controller 20. At that time, the attack detection unit 130 performs attack detection processing on the data (preprocessed data) for which the same processing as the above-described preprocessing (the first-stage processing and the second-stage processing) is performed. Upon determining that an attack has been detected as a result of performing the attack detection processing, the attack detection unit 130 generates detection information including a detection reason (information such as threshold value exceedance and features matched with an attack) and outputs the detection information to the detection alert notification unit 140. As the threshold value information and information on the feature amount of each attack, which are for generating the detection reason, information stored in advance in storage means are used.

The attack detection unit 130 updates the learning model by receiving a learning model for detection (weight data or the like) from the controller 20 at predetermined time intervals. Thereby, the attack detection unit 130 is able to perform anomaly detection that is suitable to attacks occurring in the RAN and to the communication situation.

The detection alert notification unit 140 creates a detection alert from the detection information acquired from the attack detection unit 130 and information based on the network environment and transmits the detection alert to the controller 20.

This detection alert includes, in addition to the detection information (detection reason) generated by the attack detection unit 130, information such as the communication source IP address, user terminal (UE) information, information on the accommodation destination cell or the communication device, and network routes, for example.

The handling performance unit 150 performs attack handling on the communication data in inline processing based on the handling control policy acquired from the controller 20.

Specifically, the handling performance unit 150 creates, in the hardware accelerator 10, a filter for handling based on the acquired handling control policy, and by performing filter matching confirmation on the communication data input from the NIC (not illustrated), blocks the attack communication data to perform defending.

Controller

The controller 20 is connected to the hardware accelerator 10, and performs learning processing for detecting cyber attacks, attack detection processing, and attack handling processing, in cooperation with the hardware accelerator 10 in a manner of being functionally separated.

The controller 20 is composed of a computer including a control unit, an input/output unit, and a storage unit (all not illustrated).

The input/output unit inputs and outputs information to and from the hardware accelerator 10 or the like. The input/output unit includes a communication interface that transmits and receives information via a communication line, and an input/output interface that inputs and outputs information between an input device such as a keyboard and an output device such as a monitor, which are not illustrated.

The storage unit includes a hard disk, a flash memory, a random access memory (RAM), or the like.

The storage unit temporarily stores a program for causing each function of the control unit to be performed and information required for processing of the control unit.

The control unit controls the overall processing performed by the controller 20, and includes a learning unit 210, a learning model transmission unit 220, and a handling determination unit 230 as illustrated in FIG. 1.

The learning unit 210 acquires the preprocessed data from the hardware accelerator 10 and generates an AI learning model (a learning model for detecting attacks). For example, the learning unit 210 generates the learning model by learning a normal state from normal data and by acquiring information (detection alert) determined as attack data from the below-described handling determination unit 230 and learning the features of attacks.

The learning unit 210 performs relearning for the learning model to update the learning model by acquiring the preprocessed data and attack data at predetermined time intervals.

The learning model transmission unit 220 transmits the learning model generated by the learning unit 210 to the hardware accelerator 10.

Here, the learning model transmission unit 220 may be configured to transmit all the information on the generated learning model or transmit only required weight data related to the updated learning model. Thus, the learning model transmission unit 220 can reduce the amount of data to be transmitted to the hardware accelerator 10.

The handling determination unit 230 receives the detection alert from the hardware accelerator 10 (the detection alert notification unit 140) and determines whether it is required to perform attack handling.

Specifically, the handling determination unit 230 determines whether to handle the attack according to, among pieces of information included in the detection alert, preset threat information (attack type, IP address, UE identification information) and the degree of the influence of the attack based on the threat information (e.g., frequency of attacks, influence range (service delay, service rejection, or the like)).

When the handling determination unit 230 determines to handle the attack, the handling determination unit 230 creates a handling control policy based on the threat information of the detection alert. Then, the handling determination unit 230 transmits the created handling control policy to the hardware accelerator 10 (handling performance unit 150).

The handling determination unit 230 is able to create a handling control policy based on, for example, threat information unique to the RAN (UE identification information, RAN attack, and the like).

A specific example of the threat information unique to the RAN is information related to an attack targeted to the RAN. For example, UE specific information for identifying the user terminal (UE) or UE identification information issued by a communication base station is such information. By using this information, it is possible to accurately identify a malicious UE that is a source of the attack or a UE infected with a bot (malicious program).

The handling control policy includes information required for handling the attack by the hardware accelerator 10 or the like. The information required for the attack handling is, for example, the type of attack, information on the source of the attack, information on the destination of the attack, and a handling technique. Hereinafter, handling techniques of handling an RRC protocol signaling DDoS attack in the hardware accelerator 10 will be described as an example.

In the case of an RRC protocol signaling DDoS attack, included as the type of attack is RRC protocol signaling DDoS attack and information on which signaling sequence the DoS attack is intended for. The information on the source of the attack includes UE identification information, information on the cell/communication base station accommodating the UE, and information on the radio bearer used by the UE for communication. The information on the destination of the attack includes information on the attack destination network and information on the influence of the attack. In addition, the handling techniques include packet blocking and steering to a security analysis device (not illustrated). These pieces of information are gathered into a data structure such as JavaScript object notation (JSON) as the handling control policy and are transmitted from the controller 20 to the hardware accelerator 10.

Flow of Processing

Next, a description will be given of the flow of the processing to be performed by the detection and handling control system 1000 according to the present embodiment.

Here, learning processing (FIG. 2), attack detection processing (FIG. 3), and attack handling processing (FIG. 4) will be described as processing performed in cooperation by the hardware accelerator 10 and the controller 20.

Learning Processing

Figure 2:
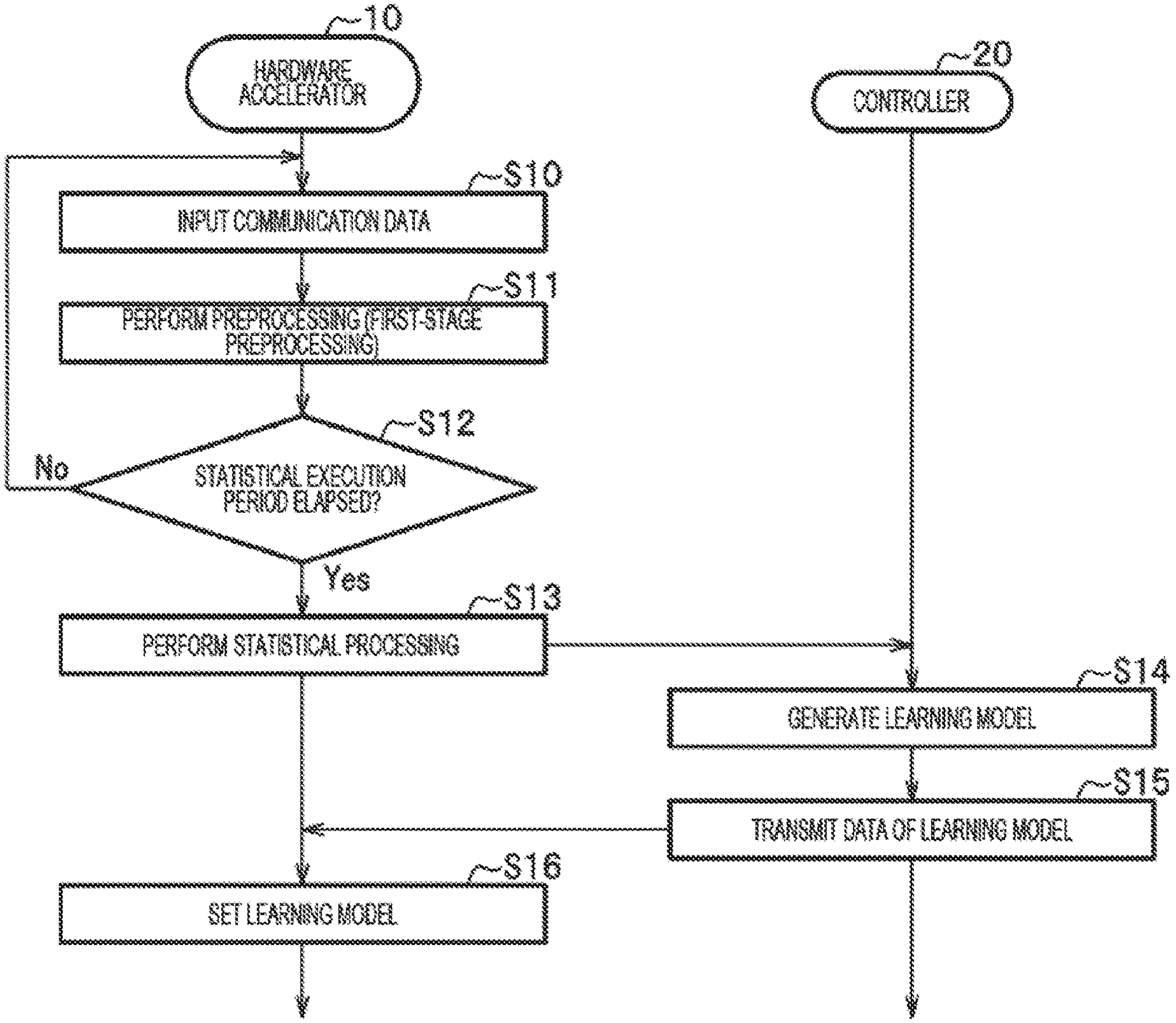
FIG. 2 is a sequence diagram illustrating the flow of the learning processing by the detection and handling control system according to the present embodiment.

FIG. 2 is a sequence diagram illustrating the flow of the learning processing by the detection and handling control system 1000 according to the present embodiment.

In the learning processing, the communication data input to the hardware accelerator 10 is preprocessed and transmitted to the controller 20. Then, the controller 20 generates a learning model using the preprocessed data and attack data and transmits the generated learning model to the hardware accelerator 10. The hardware accelerator 10 acquires and updates the learning model at predetermined time intervals. Hereinafter, a specific description will be given.

First, the data acquisition unit 110 of the hardware accelerator 10 receives (step S10) an input of communication data (e.g., U-plane data or C-plane data) transferred from the access network communication device 30.

Then, the data acquisition unit 110 acquires, of the received communication data, communication data to be subjected to the attack detection and outputs the acquired communication data to the data preprocessing unit 120.

Next, the data preprocessing unit 120 of the hardware accelerator 10 performs (step S11) the first-stage preprocessing on the acquired communication data.

As the first-stage preprocessing, the data preprocessing unit 120 performs: on the acquired communication data, removal of data not required for attack detection; and/or processing of data.

Then, the data preprocessing unit 120 determines (step S12) whether a statistical execution period (e.g., 60 seconds or 5 minutes) has elapsed. If the statistical execution time has not elapsed (No in step S12), the processing returns to step S10 to continue the acquisition of the communication data and the preprocessing.

On the other hand, if the statistical execution period has elapsed (Yes in step S12), the data preprocessing unit 120 performs (step S13) statistical processing (calculation of an average value, regularization processing, or the like) on the data on which data processing has been performed, and transmits the data on which the statistical processing has been performed to the controller 20.

The learning unit 210 of the controller 20 generates (step S14) an AI learning model by using, as learning data, the received data on which the preprocessing has been performed (the data on which the statistical processing has been performed).

Note that the learning unit 210, after the attack detection processing (FIG. 3) is performed, updates the learning model by also acquiring the information (detection alert) determined as attack data as learning data and relearning the information.

Subsequently, the learning model transmission unit 220 transmits (step S15) the learning model generated by the learning unit 210 to the hardware accelerator 10.

Here, the learning model transmission unit 220 may be configured to transmit all the data of the generated learning model to the hardware accelerator 10 or transmit only the weight data of the learning model to the hardware accelerator 10.

Next, the attack detection unit 130 of the hardware accelerator 10 acquires the learning model from the controller 20 and sets (step S16) the learning model. Here, the attack detection unit 130, when already having acquired the learning model from the controller 20 and thereafter acquired the data of the learning model, updates the set learning model using the data (e.g., the weight data of the learning model).

In this manner, the learning processing in cooperation by the hardware accelerator 10 and the controller 20 is finished. Note that the learning processing is performed in advance before attack detection processing and attack handling processing on the communication data are actually performed. In addition, even after attack detection processing and attack handling processing are performed, the learning model is updated by performing the learning processing at predetermined time intervals.

Attack Detection Processing

Next, a description will be given of attack detection processing.

Figure 3:
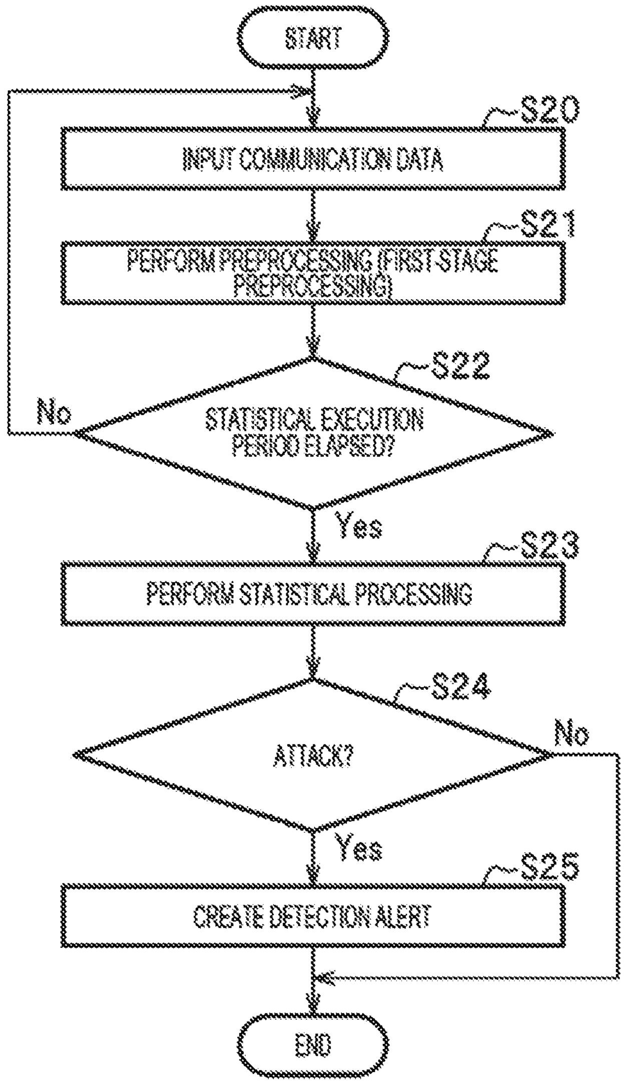
FIG. 3 is a flowchart illustrating the flow of the attack detection processing by a hardware accelerator of the detection and handling control system according to the present embodiment.

FIG. 3 is a flowchart illustrating the flow of the attack detection processing by the detection and handling control system 1000 (hardware accelerator 10) according to the present embodiment.

In the attack detection processing, the hardware accelerator 10 performs preprocessing on the acquired communication data and then detects attacks in inline processing by inputting the data to the learning model. Hereinafter, a description will be given specifically.

First, the data acquisition unit 110 of the hardware accelerator 10 receives (step S20) an input of communication data (e.g., U-plane data or C-plane data) transferred from the access network communication device 30.

Then, the data acquisition unit 110 acquires, of the received communication data, communication data to be subjected to the attack detection and outputs the acquired communication data to the data preprocessing unit 120.

Next, the data preprocessing unit 120 of the hardware accelerator 10 performs (step S21) the first-stage preprocessing on the acquired communication data.

As the first-stage preprocessing, the data preprocessing unit 120 performs: on the acquired communication data, removal of data not required for attack detection; and/or processing of data.

Then, the data preprocessing unit 120 determines (step S22) whether a statistical execution period (e.g., 60 seconds or 5 minutes) has elapsed. If the statistical execution time has not elapsed (No in step S22), the processing returns to step S20 to continue the acquisition of the communication data and the preprocessing.

On the other hand, if the statistical execution period has elapsed (Yes in step S22), the data preprocessing unit 120 performs (step S23) statistical processing (calculation of an average value, regularization processing, or the like) on the data on which data processing has been performed, and outputs the data on which the statistical processing has been performed to the attack detection unit 130.

The attack detection unit 130 performs attack detection processing on the communication data (the data on which the statistical processing has been performed) by using the set learning model and determines (step S24) whether the communication data is an attack (attack communication data).

If the attack detection unit 130 determines that the communication data is not an attack (No in step S24), the processing is finished.

On the other hand, if the attack detection unit 130 determines that the communication data is an attack (if the attack detection unit 130 detects an attack) (Yes in step S24), the attack detection unit 130 generates detection information including a detection reason (threshold value exceedance, features matched with an attack, or the like) and outputs the detection information to the detection alert notification unit 140.

The detection alert notification unit 140 creates a detection alert from the detection information acquired from the attack detection unit 130 and information based on the network environment and transmits (step S25) the detection alert to the controller 20.

This detection alert includes, for example, a communication source IP address, user terminal (UE) information, information the accommodation destination cell or communication device, a network route, and detection information (detection reason and the like).

In this manner, the attack detection processing by the hardware accelerator 10 is finished.

Attack Handling Processing

Next, a description will be given of attack handling processing.

Figure 4:
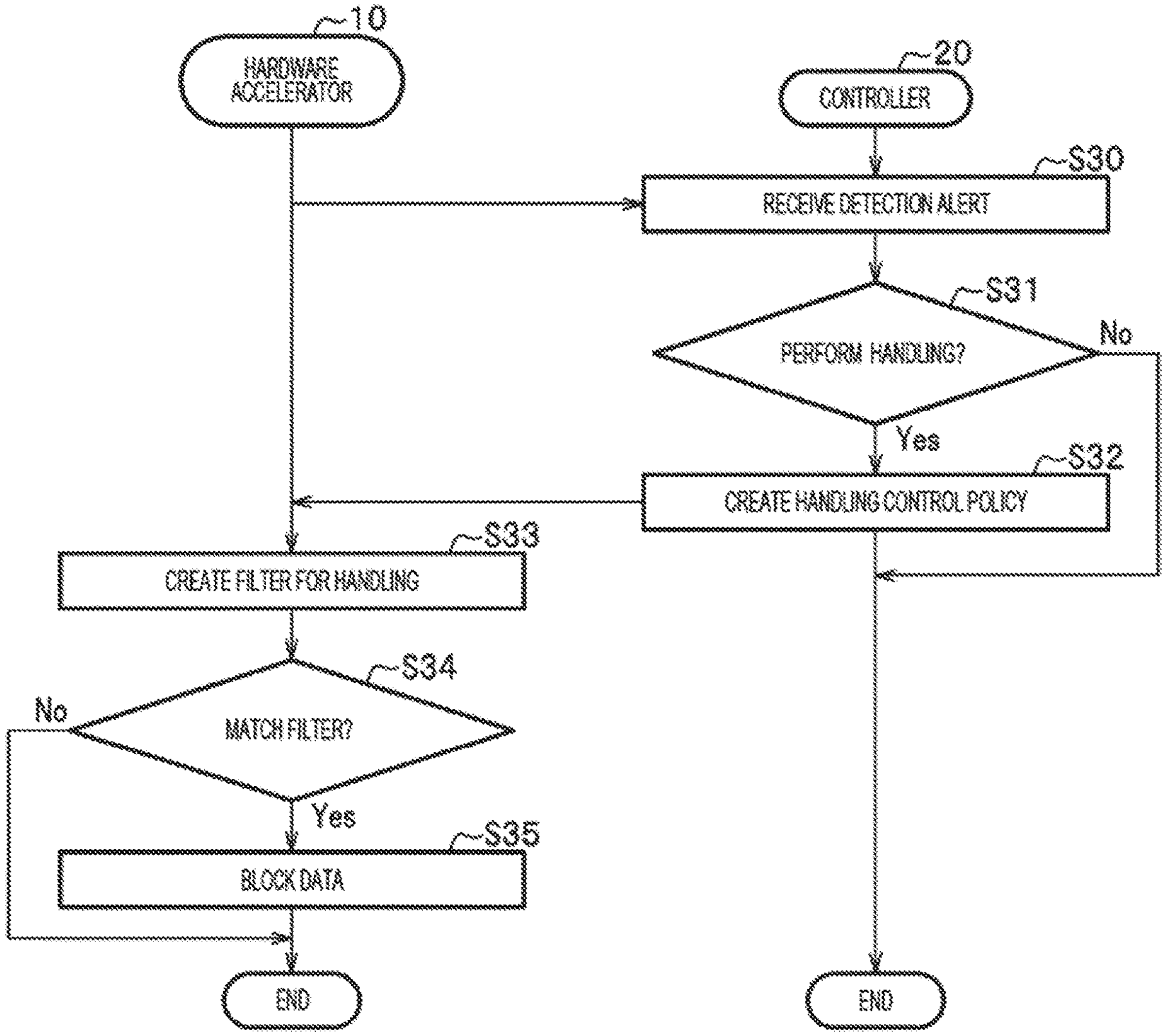
FIG. 4 is a sequence diagram illustrating the flow of the attack handling processing by the detection and handling control system according to the present embodiment.

FIG. 4 is a sequence diagram illustrating the flow of the attack handling processing by the detection and handling control system 1000 according to the present embodiment.

In the attack handling processing, the hardware accelerator 10 blocks the attack communication data by performing filtering, based on the handling control policy created by the controller 20. Hereinafter, a description will be given specifically.

First, the handling determination unit 230 of the controller receives (step S30) a detection alert from the hardware accelerator 10.

Subsequently, the handling determination unit 230 determines (step S31) whether attack handling is required based on the threat information included in the detection alert.

Here, the threat information is, for example, a type of attack, an IP address, UE identification information, and the like. The handling determination unit 230 determines whether to handle the attack based on the threat information and the degree of influence of the attack (frequency of the attack, influence range, and the like).

Here, if the handling determination unit 230 determines not to handle the attack (No in step S31), the processing is finished.

On the other hand, if the handling determination unit 230 determines to handle the attack (Yes in step S31), the handling determination unit 230 creates (step S32) a handling control policy based on the threat information included in the detection alert and transmits the handling control policy to the hardware accelerator 10.

Next, the handling performance unit 150 of the hardware accelerator 10 creates (step S33), in the hardware accelerator 10, a filter for handling based on the acquired handling control policy.

Subsequently, the handling performance unit 150 determines (step S34) whether the communication data acquired from the access network communication device 30 or the data obtained by performing preprocessing (statistical processing) on the communication data by the data preprocessing unit 120 matches the filter.

Then, if there is no match with the filter (No in step S34), the processing is finished without performing handling.

On the other hand, if there is a match with the filter (Yes in step S34), the handling performance unit 150 performs (step S35) handling to block the communication data as attack communication data.

In this way, the hardware accelerator 10 is able to block the attack communication data by filtering, based on the handling control policy created by the controller 20.

MODIFICATION EXAMPLE

Next, a modification example of the detection and handling control system 1000 according to the present embodiment will be described.

In the detection and handling control system 1000 illustrated in FIG. 1, data transfer from the access network communication device 30 is performed, and the hardware accelerator 10, by acquiring the transferred data, implements processing of attack detection and attack handling in cooperation with the controller 20.

In contrast, in the case of a detection and handling control system 1000A according to the modification example of the present embodiment, the NIC-equipped FPGA board (hardware accelerator 10) is connected to the access network communication device 30, and the processing of attack detection and attack handling is performed in an inline manner in the FPGA board. Thereby, low latency and reduction in consumption of resources used in the communication device are achieved.

The NIC-equipped FPGA board is, for example, an FPGA SmartNIC, and can be connected to a communication device (access network communication device 30) that is constructed on a general-purpose intel architecture (IA) server using an extension interface such as PCIe.

Figure 5:
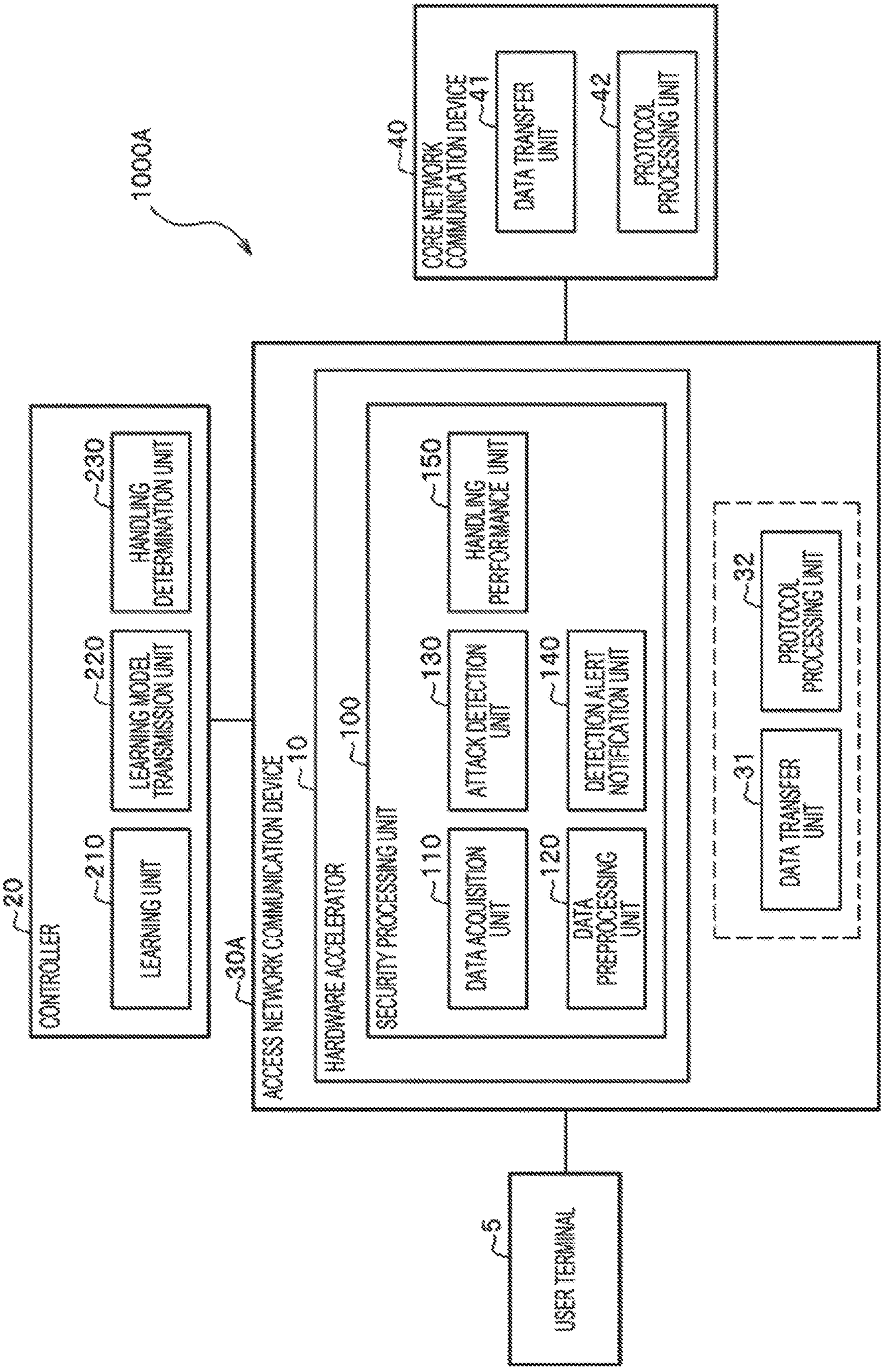
FIG. 5 is a diagram illustrating the overall configuration of a detection and handling control system according to a modification example of the present embodiment.

FIG. 5 is a diagram illustrating the overall configuration of the detection and handling control system 1000A according to the modification example of the present embodiment.

As illustrated in FIG. 5, the access network communication device 30A includes a security processing unit 100 (e.g., configured with an FPGA SmartNIC) of the hardware accelerator 10. The functions (data acquisition unit 110, data preprocessing unit 120, attack detection unit 130, detection alert notification unit 140, and handling performance unit 150) of the security processing unit 100 are the same as the functions of the security processing unit 100 illustrated in FIG. 1.

The access network communication device 30A, in response to the input communication data, transfers the data to the connected FPGA board (hardware accelerator 10). In the FPGA board (the hardware accelerator 10), the input communication data is input to a built-in user logic, and attack detection and attack handling are performed by this user logic. Thereby, attack detection and attack handling are able to be performed in an inline manner without going through the CPU of the access network communication device 30A. As a result, the access network communication device 30A does not need to perform processing of attack detection and attack handling, which makes it possible to reduce the delay time and consumption of the resources used.

Note that as each function and the flow of the processing in the security processing unit 100 are similar to those of the detection and handling control system 1000 according to the present embodiment, description thereof will be omitted.

Hardware Configuration

Figure 6:
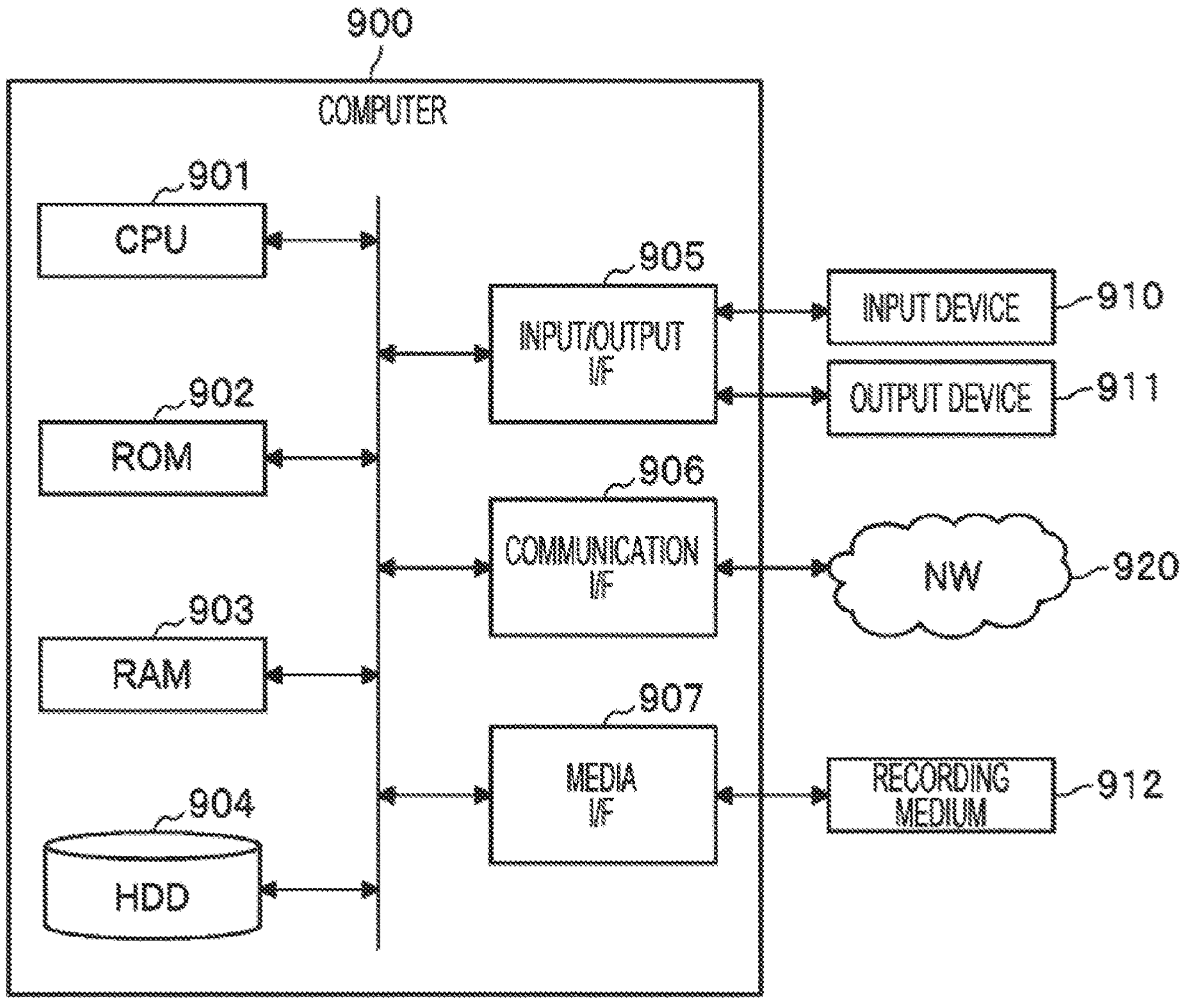
FIG. 6 is a hardware configuration diagram illustrating an example of a computer that implements functions of a controller according to the present embodiment.

The controller 20 of the detection and handling control system 1000 according to the present embodiment is implemented by, for example, a computer 900 having the configuration as illustrated in FIG. 6.

FIG. 6 is a hardware configuration diagram illustrating an example of the computer 900 that implements the functions of the controller 20 according to the present embodiment. The computer 900 includes a central processing unit (CPU) 901, a read only memory (ROM) 902, a RAM 903, a hard disk drive (HDD) 904, an input/output interface (I/F) 905, a communication I/F 906, and a media I/F 907.

The CPU 901 operates based on a program stored in the ROM 902 or the HDD 904, and performs control by the control unit (learning unit 210, learning model transmission unit 220, and handling determination unit 230). The ROM 902 stores a boot program to be executed by the CPU 901 when the computer 900 is started, a program related to the hardware of the computer 900, and the like.

The CPU 901 controls an input device 910 such as a mouse or a keyboard and an output device 911 such as a display or a printer via the input/output I/F 905. The CPU 901 acquires data from the input device 910 and outputs generated data to the output device 911 via the input/output I/F 905. A graphics processing unit (GPU) or the like may be used as a processor together with the CPU 901.

The HDD 904 stores a program to be executed by the CPU 901, data to be used by the program, and the like. The communication I/F 906 receives data from another device via a communication network (e.g., network (NW) 920), outputs the data to the CPU 901, and transmits data generated by the CPU 901 to another device via the communication network.

The media I/F 907 reads a program or data stored in a recording medium 912, and outputs the program or data to the CPU 901 via the RAM 903. The CPU 901 loads a program related to target processing from the recording medium 912 onto the RAM 903 via the media I/F 907 and executes the loaded program. The recording medium 912 is an optical recording medium such as a digital versatile disc (DVD) or a phase change rewritable disk (PD), a magneto-optical recording medium such as a magneto optical disk (MO), a magnetic recording medium, a semiconductor memory, or the like.

In a case where the computer 900 functions as the controller 20 according to the present invention, for example, the CPU 901 of the computer 900 implements the functions of the controller 20 by executing the program loaded on the RAM 903. In addition, the HDD 904 stores data in the RAM 903. The CPU 901 reads the program related to the target processing from the recording medium 912 and executes the program. Additionally, the CPU 901 may read the program related to the target processing from other devices via the communication network (NW 920).

Effects

Hereinafter, effects of the detection and handling control system 1000 and the like according to the present invention will be described.

A detection and handling control system according to the present invention is a detection and handling control system 1000 that performs detection and handling of a cyber attack, the detection and handling control system 1000 including: a controller 20 that performs network control in an access network; and a hardware accelerator 10 that is connected to a communication device (access network communication device 30) of the access network and to the controller 20, wherein the hardware accelerator 10 includes: a data acquisition unit 110 that acquires communication data from the communication device; a data preprocessing unit 120 that performs, on the acquired communication data, preprocessing of extracting predetermined data required for attack detection and performing statistical processing on the extracted data, and transmits the preprocessed data to the controller 20; an attack detection unit 130 that acquires a learning model for detecting an attack to be executed through the communication data from the controller 20 and makes a determination in inline processing using the learning model as to whether the communication data acquired by the data acquisition unit 110 is the attack; a detection alert notification unit 140 that generates a detection alert including detection information and network information and transmits the detection alert to the controller 20, the detection information including a detection reason of the communication data determined as the attack, the network information being related to the communication data; and a handling performance unit 150 that performs, based on a handling control policy acquired from the controller 20 and including information required for attack handling, attack handling on the communication data acquired by the data acquisition unit 110 in inline processing, and wherein the controller 20 includes: a learning unit 210 that acquires the preprocessed data and generates the learning model for detecting the attack to be executed through the communication data; and a handling determination unit 230 that makes a determination using the acquired detection alert as to whether attack handling is required, and when attack handling is required, creates the handling control policy including a type of the attack and a handling technique and transmits the handling control policy to the hardware accelerator 10.

As described above, in the detection and handling control system 1000, the hardware accelerator 10 and the controller 20 are functionally separated regarding learning, attack detection, and attack handling, which makes it possible to reduce the delay time in attack detection and attack handling and to reduce the resources used in the communication device (access network communication device 30). In addition, the detection and handling control system 1000 is able to perform attack detection and attack handling with a low latency and low resources. Thus, it is possible to perform, even in a network with strict delay requirements, data analysis, attack detection, and attack handling in real time, and perform secure network operations.

Further, in the detection and handling control system 1000, the hardware accelerator 10 and the controller 20 are functionally separated regarding security-related functions in learning, attack detection, and attack handling, which makes it possible to introduce security functionality without affecting services, such as a load and a delay on the communication device (access network communication device 30).

Furthermore, the detection and handling control system 1000 includes the programmable hardware accelerator 10, which makes it possible to perform switching of offloading specific processing. Therefore, it is possible to, while sharing the security function with other functions, reduce the resources used and improve power efficiency as compared with the operation by the CPU of the communication device.

Further, in the detection and handling control system 1000, the learning unit 210 of the controller 20 performs relearning of the learning model by using the preprocessed data acquired at predetermined time intervals and information on the detection alert based on which attack handling is determined as required and transmits the learning model on which the relearning has been performed to the hardware accelerator 10, and the attack detection unit 130 of the hardware accelerator 10 updates its own learning model by the relearned learning model.

In this way, the detection and handling control system 1000 is able to update the learning model according to the communication situation to perform more appropriate attack detection.

A detection and handling control system according to the present invention is a detection and handling control system 1000A for performing detection and handling of a cyber attack, the detection and handling control system 1000A including: a controller 20 that performs network control in an access network; and a communication device (access network communication device 30A) of the access network, the communication device being equipped with a hardware accelerator 10 connected to the controller 20, wherein the hardware accelerator 10 includes: a data acquisition unit 110 that acquires communication data input to the communication device (access network communication device 30A); a data preprocessing unit 120 that performs, on the acquired communication data, preprocessing of extracting predetermined data required for attack detection and performing statistical processing on the extracted data, and transmits the preprocessed data to the controller 20; an attack detection unit 130 that acquires a learning model for detecting an attack to be executed through the communication data from the controller 20 and makes a determination in inline processing using the learning model as to whether the communication data acquired by the data acquisition unit 110 is the attack; a detection alert notification unit 140 that generates a detection alert including detection information and network information and transmits the detection alert to the controller 20, the detection information including a detection reason of the communication data determined as the attack, the network information being related to the communication data; and a handling performance unit 150 that performs, based on a handling control policy acquired from the controller 20 and including information required for attack handling, attack handling on the communication data acquired by the data acquisition unit 110 in inline processing, and wherein the controller 20 includes: a learning unit 210 that acquires the preprocessed data and generates the learning model for detecting the attack to be executed through the communication data; and a handling determination unit 230 that makes a determination using the acquired detection alert as to whether attack handling is required, and when attack handling is required, creates the handling control policy including a type of the attack and a handling technique and transmits the handling control policy to the hardware accelerator 10.

As described above, in the detection and handling control system 1000A, the hardware accelerator 10 equipped in the communication device (access network communication device 30A) and the controller 20 are functionally separated regarding learning, attack detection, and attack handling, which makes it possible to reduce the delay time in attack detection and attack handling and to reduce the resources used in the communication device (access network communication device 30). In addition, the detection and handling control system 1000A is able to perform attack detection and attack handling with a low latency and low resources. Thus, it is possible to perform, even in a network with strict delay requirements, data analysis, attack detection, and attack handling in real time, and perform secure network operations.

Furthermore, in the detection and handling control system 1000A, the communication data input to the communication device (access network communication device 30A) is transferred to the hardware accelerator 10. Therefore, attack detection and attack handling are able to be performed in an inline manner without going through the CPU of a server composing the communication device. As a result, the communication device does not need to perform attack detection and attack handling, and the delay time and the resources used in the communication device can be reduced.

A hardware accelerator according to the present invention is a hardware accelerator 10 that is connected to a controller 20 that performs network control in an access network and to a communication device (access network communication device 30) of the access network, the hardware accelerator 10 including: a data acquisition unit 110 that acquires communication data from the communication device (access network communication device 30); a data preprocessing unit 120 that performs, on the acquired communication data, preprocessing of extracting predetermined data required for attack detection and performing statistical processing on the extracted data, and transmits the preprocessed data to the controller 20; an attack detection unit 130 that acquires a learning model for detecting an attack to be executed through the communication data from the controller 20 and makes a determination in inline processing using the learning model as to whether the communication data acquired by the data acquisition unit 110 is the attack; a detection alert notification unit 140 that generates a detection alert including detection information and network information and transmits the detection alert to the controller 20, the detection information including a detection reason of the communication data determined as the attack, the network information being related to the communication data; and a handling performance unit 150 that performs, based on a handling control policy acquired from the controller 20 and including information required for attack handling, attack handling on the communication data acquired by the data acquisition unit 110 in inline processing.

With this configuration, the hardware accelerator 10 is functionally separated with the controller 20 in learning, attack detection, and attack handling, to be able to perform attack detection using the learning model acquired from the controller 20 and perform attack handling based on the handling control policy acquired from the controller 20. Thereby, it is possible to reduce the delay time in attack detection and attack handling and to reduce the resources used in the communication device (the access network communication device 30).

A controller according to the present invention is a controller 20 that is communicably connected with a hardware accelerator 10 connected to a communication device (access network communication device 30) of an access network, the controller 20 including: a learning unit 210 that acquires, from the hardware accelerator 10, communication data on which preprocessing of extracting predetermined data required for attack detection and performing statistical processing on the extracted data has been performed and generates a learning model for detecting an attack to be executed through the communication data; and a handling determination unit 230 that acquires a detection alert on the communication data in which the attack is detected by the hardware accelerator 10 using the learning model, makes a determination using the acquired detection alert as to whether attack handling is required, and when attack handling is required, creates a handling control policy including a type of the attack and a handling technique and transmits the handling control policy to the hardware accelerator 10.

With this configuration, the controller 20 is functionally separated with the hardware accelerator 10 in learning, attack detection, and attack handling, to be able to generate a learning model for detecting an attack and create a handling control policy. Thereby, it is possible to reduce the delay time in attack detection and attack handling and to reduce the resources used in the communication device (the access network communication device 30).

The present invention is not limited to the above-described embodiment, and many modifications can be made by those skilled in the art within the technical idea of the present invention.

REFERENCE SIGNS LIST

5 User terminal
10 Hardware accelerator
20 Controller
30, 30A Access network communication device
31 Data transmission unit
32 Protocol processing unit
40 Core network communication device
41 Data transmission unit
42 Protocol processing unit
100 Security processing unit
110 Data acquisition unit
120 Data preprocessing unit
130 Attack detection unit
140 Detection alert notification unit
150 Handling performance unit
210 Learning unit
220 Learning model transmission unit
230 Handling determination unit
1000, 1000A Detection and handling control system

The invention claimed is:

1. An attack detection and handling control system for performing detection and handling of a cyber attack, the attack detection and handling control system comprising:

a controller configured to perform network control in an access network; and a hardware accelerator configured to be connected to a communication device of the access network and to the controller, wherein the hardware accelerator comprises:

a data acquisition unit configured to acquire communication data from the communication device that constitutes a radio access network;

a data preprocessing unit configured to extract attack feature data from the acquired communication data, the attack feature data including at least one of UE identification information, cell information and, a type of an RRC request message, and to perform statistical processing on the extracted attack feature data, the statistical processing including at least one of calculation of an average value, a variance value, a maximum value, and a minimum value of the extracted attack feature data, regularization processing and standardization processing on the extracted attack feature data, and transmit the processed data to the controller;

an attack detection unit configured to receive a learning model for detecting an attack to be executed through the communication data from the controller and make a first determination in inline processing using the learning model as to whether the communication data acquired by the data acquisition unit is the attack;

a detection alert notification unit configured to generate a detection alert including detection information and network information and transmits the detection alert to the controller, the detection information including a detection reason of the communication data determined as the attack, the network information being related to the communication data; and a handling performance unit configured to acquire, from the controller, a handling control policy including information required for attack handling, and perform, based on the acquired handling control policy, the attack handling on the communication data acquired by the data acquisition unit in inline processing, and wherein the controller comprises:

a learning unit configured to receive the preprocessed data from the hardware accelerator and, based on the received preprocessed data, generate the learning model for detecting the attack to be executed through the communication data; and a handling determination unit configured to receive the detection alert from the hardware accelerator, make a second determination using the received detection alert as to whether attack handling is required, and when the second determination is that attack handling is required, create the handling control policy so as to include a type of the attack and a handling technique and transmit the handling control policy to the hardware accelerator.

2. The attack detection and handling control system according to claim 1, wherein the attack detection unit of the hardware accelerator is further configured to set the received learning model in the hardware accelerator and makes the first determination using the set received learning model, wherein the data preprocessing unit of the hardware accelerator is further configured to perform the preprocessing and transmit the preprocessed data to the controller at predetermined time intervals, wherein the learning unit of the controller is further configured to:

receive the preprocessed data from the hardware accelerator at the predetermined time intervals, perform relearning of the learning model by using the preprocessed data received at the predetermined time intervals and information on the detection alert based on which attack handling is determined as required, and transmit the learning model on which the relearning has been performed to the hardware accelerator, and wherein the attack detection unit of the hardware accelerator is further configured to receive the learning model on which the relearning has been performed and update the learning model set in the hardware accelerator with the learning model on which the relearning has been performed.

3. An attack detection and handling control system for performing detection and handling of a cyber attack, the attack detection and handling control system comprising:

a controller configured to perform network control in an access network; and a communication device of the access network, the communication device being equipped with a hardware accelerator configured to be connected to the controller, wherein the hardware accelerator comprises:

a data acquisition unit configured to acquire communication data input to the communication device that constitutes a radio access network;

a data preprocessing unit configured to extract attack feature data from the acquired communication data, the attack feature data including at least one of UE identification information, cell information and, a type of an RRC request message, and to perform statistical processing on the extracted attack feature data, the statistical processing including at least one of calculation of an average value, a variance value, a maximum value, and a minimum value of the extracted attack feature data, regularization processing and standardization processing on the extracted attack feature data, and transmit the processed data to the controller;

an attack detection unit configured to receive a learning model for detecting an attack to be executed through the communication data from the controller and make a first determination in inline processing using the learning model as to whether the communication data acquired by the data acquisition unit is the attack;

a detection alert notification unit configured to generate a detection alert including detection information and network information and transmits the detection alert to the controller, the detection information including a detection reason of the communication data determined as the attack, the network information being related to the communication data; and a handling performance unit configured to acquire, from the controller, a handling control policy including information required for attack handling, and perform, based on the acquired handling control policy, the attack handling on the communication data acquired by the data acquisition unit in inline processing, and wherein the controller comprises:

a learning unit configured to receive the preprocessed data from the hardware accelerator and, based on the received preprocessed data, generate the learning model for detecting the attack to be executed through the communication data; and a handling determination unit configured to receive the detection alert from the hardware accelerator, make a second determination using the received detection alert as to whether attack handling is required, and when the second determination is that attack handling is required, create the handling control policy so as to include a type of the attack and a handling technique and transmit the handling control policy to the hardware accelerator.

4. An attack detection and handling control method of an attack detection and handling control system for performing detection and handling of a cyber attack, the attack detection and handling control system including: a controller that performs network control in an access network; and a hardware accelerator that is connected to a communication device of the access network and to the controller, the attack detection and handling control method comprising steps of:

by the hardware accelerator, acquiring communication data from the communication device that constitutes a radio access network;

by the hardware accelerator, extracting attack feature data from the acquired communication data, the attack feature data including at least one of UE identification information, cell information and, a type of an RRC request message, performing statistical processing on the extracted attack feature data, the statistical processing including at least one of calculation of an average value, a variance value, a maximum value, and a minimum value of the extracted attack feature data, regularization processing and standardization processing on the extracted attack feature data and transmitting the processed data to the controller;

by the controller, receiving the preprocessed data from the hardware accelerator and, based on the received preprocessed data, generating a learning model for detecting an attack to be executed through the communication data;

by the hardware accelerator, acquiring the learning model from the controller and making a first determination in inline processing using the learning model as to whether the acquired communication data is the attack;

by the hardware accelerator, generating a detection alert including detection information and network information and transmitting the detection alert to the controller, the detection information including a detection reason of the communication data determined as the attack, the network information being related to the communication data;

by the controller, receiving the detection alert from the hardware accelerator, making a second determination using the received detection alert as to whether attack handling is required, and when the second determination is that attack handling is required, creating a handling control policy including a type of the attack and a handling technique and transmitting the handling control policy to the hardware accelerator; and by the hardware accelerator, acquiring the handling control policy from the controller and performing, based on the acquired handling control policy, attack handling on the acquired communication data in inline processing.

5. A hardware accelerator configured to be connected to a controller that performs network control in an access network and to a communication device of the access network, the hardware accelerator comprising:

a data acquisition unit configured to acquire communication data from the communication device that constitutes a radio access network;

a data preprocessing unit configured to extract attack feature data from the acquired communication data, the attack feature data including at least one of UE identification information, cell information and, a type of an RRC request message, and to perform statistical processing on the extracted attack feature data, the statistical processing including at least one of calculation of an average value, a variance value, a maximum value, and a minimum value of the extracted attack feature data, regularization processing and standardization processing on the extracted attack feature data, and transmit the processed data to the controller;

an attack detection unit configured to receive a learning model for detecting an attack to be executed through the communication data from the controller and make a first determination in inline processing using the learning model as to whether the communication data acquired by the data acquisition unit is the attack;

a detection alert notification unit configured to generate a detection alert including detection information and network information and transmits the detection alert to the controller, the detection information including a detection reason of the communication data determined as the attack, the network information being related to the communication data; and a handling performance unit configured to acquire, from the controller, a handling control policy including information required for attack handling, and perform, based on the acquired handling control policy, the attack handling on the communication data acquired by the data acquisition unit in inline processing.

6. A controller configured to be communicably connected with a hardware accelerator connected to a communication device of an access network, the controller comprising:

a learning unit configured to acquire, from the hardware accelerator, communication data on which extracting attack feature data from the acquired communication data, the attack feature data including at least one of UE identification information, cell information and, a type of an RRC request message, and performing statistical processing on the extracted attack feature data, the statistical processing including at least one of calculation of an average value, a variance value, a maximum value, and a minimum value of the extracted attack feature data, regularization processing and standardization processing on the extracted attack feature data and generate a learning model for detecting an attack to be executed through the communication data; and a handling determination unit configured to acquire a detection alert on the communication data in which the attack is detected by the hardware accelerator using the learning model, make a determination using the acquired detection alert as to whether attack handling is required, and when the determination is that the attack handling is required, create a handling control policy including a type of the attack and a handling technique and transmit the handling control policy to the hardware accelerator.

7. A non-transitory computer-readable medium storing a computer program causing a computer to function as the controller according to claim 6.

* * * * *